United States Patent [19]

Harman et al.

[11] Patent Number: 5,517,939

[45] Date of Patent: May 21, 1996

[54] THERMOPLASTIC BOTTOM INFLATABLE BOAT

[75] Inventors: Jayden D. Harman; Amanda L. Gruhn, both of Clifton Gardens, Australia

[73] Assignee: Tank And Pipe Welding Pty Ltd., Australia

[21] Appl. No.: 81,258

[22] PCT Filed: Dec. 20, 1991

[86] PCT No.: PCT/AU91/00591

§ 371 Date: Jul. 29, 1993

§ 102(e) Date: Jul. 29, 1993

[87] PCT Pub. No.: WO92/11179

PCT Pub. Date: Jul. 9, 1992

[30] Foreign Application Priority Data

Dec. 24, 1990 [AU] Australia .................. PK4047

[51] Int. Cl.⁶ .................... B63B 7/00
[52] U.S. Cl. .................... 114/345; 114/357
[58] Field of Search .................. 114/344, 345, 114/355, 357; 441/40, 41, 42

[56] References Cited

U.S. PATENT DOCUMENTS 4,545,319  10/1985  Ferronniere et al. .......... 114/345
4,667,618  5/1987  Cigognetti .
4,750,448  6/1988  Hennebutte .............. 114/345
5,228,407  7/1993  Cummer et al. .......... 114/345

FOREIGN PATENT DOCUMENTS 263964      6/1963   Australia .
61069/69    3/1971   Australia .
24641/71    7/1972   Australia .
31683/84    2/1985   Australia .
0193874     2/1986   European Pat. Off. .
2070272     9/1971   France .
2297164     1/1975   France .
79204264    1/1979   Taiwan .
2053085     2/1981   United Kingdom .
WO89/11995  12/1989  WIPO .

OTHER PUBLICATIONS

*Life Boat Design and Development*, p. 125, Dwg. No. 33 "The 'Atlantic 21'Inshore Rescue Boat".

Primary Examiner—Stephen Avila
Attorney, Agent, or Firm—Ostrolenk, Faber, Gerb & Soffen

[57] ABSTRACT

A boat formed from a flexible hull bottom and side skirts in the form of tapered inflatable tubes. The side skirts are fastened to the hull bottom by flexible adhesive tape or other continuous flexible mechanical fasteners so that there are no hard fastenings or frames to cause stress concentration in the flexible hull bottom.

20 Claims, 2 Drawing Sheets

THERMOPLASTIC BOTTOM INFLATABLE BOAT

TECHNICAL FIELD

This invention relates to a boat and has been devised particularly though not solely as a design for a small boat which can be simply manufactured using mass production techniques.

BACKGROUND ART

In the past 30 years small boats have generally been constructed from two major materials, namely glass reinforced plastics (fiberglass) and sheet aluminium. Small fiberglass boats have the disadvantage that they are heavy and therefore difficult to handle, requiring high power and fuel for their propulsion, they are manufactured from materials which are arguably carcenogenic, they are flammable, suffer from osmosis and are difficult to repair when damaged. Aluminum boats are expensive due to the base cost of the material, are noisy in use due to wave pounding, suffer from dents and cracks in use and are prone to electrolysis.

Both fiberglass and aluminum small boats are labor intensive to manufacture and are expensive to transport to point of sale in bulk quantities. Neither fiberglass nor aluminum boats are particularly stable due to the design limitations imposed by the economic use of these materials.

A third type of small boat presently in the market is the inflatable or semi-rigid inflatable craft which has the advantage of being immensely stable and, because they can be deflated, are relatively easily transported. The main disadvantage and limiting factor of inflatable craft is that many are made by hand and are particularly expensive. If the craft are fully inflatable they usually do not ride very well in rough water as the hull bottom is relatively flat and pounds when it hits waves. If the craft has a rigid hull (semi-rigid inflatable craft), the hull is rigid and heavy and loses any ease of transport advantages of the fully inflatable craft. The flexible skirt and rigid hull are physically at odds with each other.

In prior art craft with inflatable tubes the tube surrounds both sides and the bow (and in some craft the stern as well). This has a number of disadvantages:
(1) cost is greatly increased because of the number of seams and angles and wasted fabric offcuts;
(2) there is great room for error in construction;
(3) the bow of the craft may have excessive bouyancy when travelling through waves (causing destructive stress in the center of the craft and impact shock to the passengers).

Attempts have been made in the past to overcome the labor intensive, and therefore expensive, method of manufacturing small boats by roto-moulding boats from various plastics materials. This method has never been very acceptable in the market place as the final product is heavy, very limited in design range and does not have a very long servicable life. Once again the end product is bulky and difficult to transport in large quantities to the point of sale.

DISCLOSURE OF THE INVENTION

Accordingly, in one aspect, the present invention provides a method of constructing a boat comprising the steps of:
(a) forming a hull bottom from thermoplastics material;
(b) providing side skirts in the form of inflatable tubes; and
(c) securing the side skirts to the hull bottom.

Preferably the thermoplastics material comprises sheet acrylic material or co-extruded acrylic and other thermoplastic material.

Preferably the hull bottom is vacuum molded from the sheet thermoplastics material.

Alternatively the hull bottom is injection molded from thermoplastics material.

Preferably the step of securing the side skirts to the hull bottom comprises bonding by way of flexible acrylic adhesive tape or glue.

Alternatively the side skirts are secured to the hull bottom by mechanical fasteners such as brackets, zip fasteners, or hook and loop tape (e.g. Velcro T.M.)

Unlike conventional craft which are built excessively rigid, stiff, strong and subsequently heavy to withstand the destructive forces of the marine environment, a boat constructed according to the method of the present invention is made entirely from lightweight, energy absorbing materials and is constructed in such a fashion that any impact encountered on any part of the craft will be dissipated throughout the craft. The entire craft flexes on impact ensuring a softer, safer ride and greatly minimizing the possibility of sustaining damage. This unique and novel feature is obtained by use of all flexible materials and adhesives, no frames or rigidizing floors and no hard fastenings.

As the craft is so light in weight, destructive, inertia forces are substantially less than in conventional craft.

Preferably the flexible adhesive tape comprises double-sided adhesive tape running the full length of all contact points.

Preferably the adhesive tape is the type of product manufactured by the 3M Company under the general product range known as "Very Strong Bond" tapes.

Typically the hull material is a Rohm and Hass product, manufactured in the USA and marketed in Australia by BTR Nylex as 2000XT.

Alternatively the hull bottom is molded from polycarbonate or Lexan material, or some other suitable thermoplastics material.

In one form of the invention the hull is fabricated by laminating two hull shells together one inside the other, bonded by flexible energy absorbing adhesives.

Preferably the hull bottom incorporates an integrally molded transom portion upturned between the side skirts at the aft end of the hull bottom.

Preferably the transom portion is reinforced by laminating a second layer of sheet thermoplastics material to the transom and the hull bottom in the region of the transom, using flexible acrylic adhesive tape.

Alternatively the transom portion is reinforced by bonding an injection molded plastics reinforcing member to the transom.

Preferably the side skirts are circular or oval in section and tapered in configuration from a smaller section nearer the bow to a larger section nearer the stern.

In a further aspect the invention consists in a boat comprising a hull bottom formed from thermoplastics material and side skirts in the form of inflatable tubes secured to the hull bottom.

BRIEF DESCRIPTION OF THE DRAWINGS

Notwithstanding any other forms that may fall within its scope, one preferred form of the invention will now be described by way of example only with reference to the accompanying drawings, in which.

MODES FOR CARRYING OUT THE INVENTION

Figure 1:
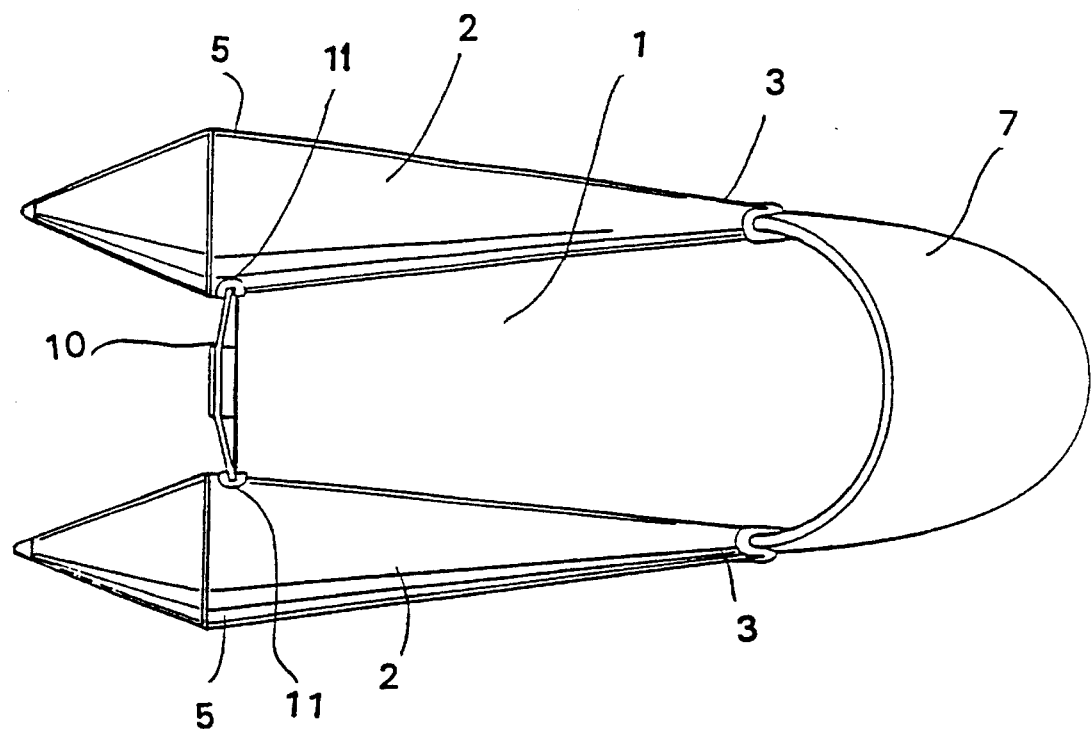
FIG. 1 is a plan view of a boat according to the invention.

In the preferred form of the invention a small boat (typically 3 meters in length) is constructed from a hull bottom (1) formed from thermoplastics material to which are secured two side skirts (2) in the form of inflatable tubes, generally circular or oval in section and tapering from a smaller section (3) nearer the bow (4) of the boat to a larger section (5) nearer the stern of the boat.

The boat also incorporates structural stiffening through a flexible and impact absorbing topside cowling (7) over the bow portion.

Both the hull bottom (1) and the topside cowling (7) are formed from thermoplastics material and preferably from sheet acrylic material. The hull bottom is typically either thermo-formed by vacuum molding from sheet stock or alternatively is injection molded. A typical material is the Rohm and Hass product manufactured in the USA and marketed in Australia by BTR Nylex as 2000XT.

Figure 2:
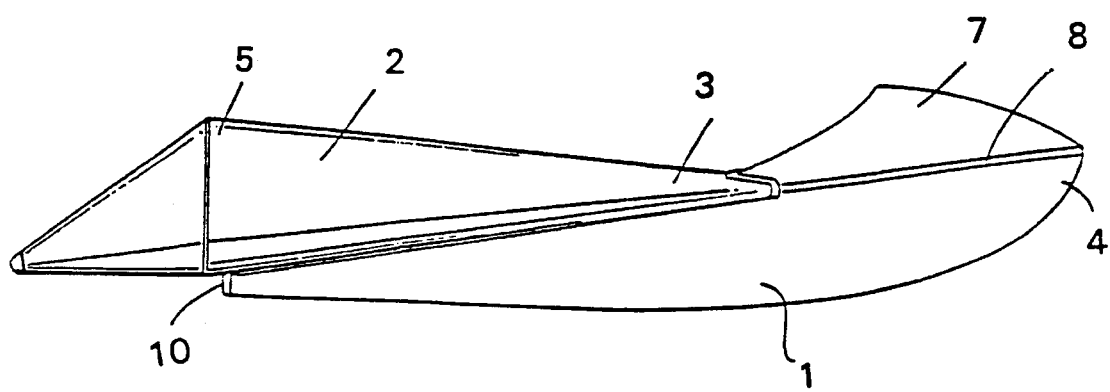
FIG. 2 is a side view of the boat shown in FIG. 1.
Figure 3:
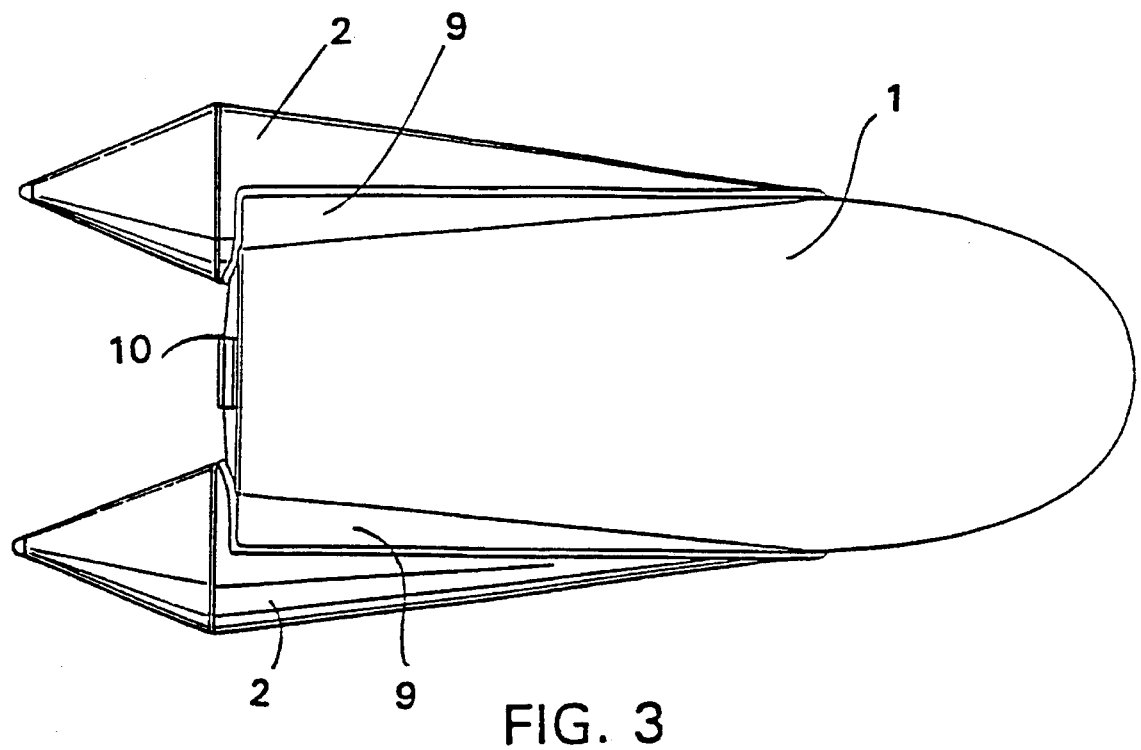
FIG. 3 is an underside view of the boat.
Figure 4:
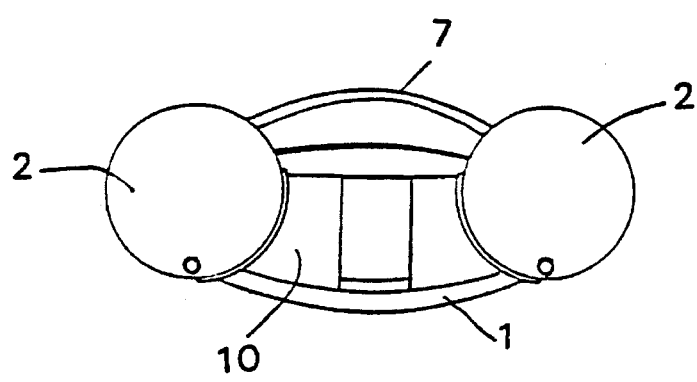
FIG. 4 is a rear view of the boat.

The topside cowling is bonded to the hull bottom along join lines (8) by the use of a double-sided adhesive acrylic tape, and similarly the inflatable side skirts (2) are preferably bonded to the hull bottom using similar tape. To facilitate the bonding of the side skirts to the hull, the outer edges of the hull are turned outwardly to form suitable bonding flanges (9) as can be clearly seen in FIG. 2.

Alternatively the side skirts may be fastened to the hull bottom by continuous mechanical fasteners such as extruded plastics mouldings used in conjunction with hook and loop fastening tape or zip fasteners. It is important that the fastening be substantially continuous so as to avoid any hard spots or stress points which would crack or split the thermoplastic hull bottom.

The inflatable side skirts (2) can be formed from any suitable material but are preferably formed from plasticised PVC. The ends of the inflatable side skirt tubes are typically completed by crimping or bonding, and at the forward end of the tubes, the crimped portions are attached inside the topside cowling (7).

At the rear of the hull bottom (1), the sheet thermoplastics material is upturned to form a transom (10) which can similarly be provided with end flanges (11), bonded to the inflated side skirts (2) by way of double-sided tape or other flexible adhesive. The transom may be reinforced to take an outboard motor by laminating a second layer of sheet thermoplastics material to the transom, and to the hull bottom in the vicinity of the transom, once again using double-sided adhesive tape. Alternatively the transom cab be reinforced by other methods such as bonding an injection molded plastics reinforcing member to the transom in desired locations.

It is a particular feature of a boat constructed as described above that there are no "hard" fastenings or fixtures anywhere in the boat. All of the materials and bonding methods used in the construction are flexible or semi-rigid so that the end result is a boat which forms an energy absorbing module able to flex and give with impact in use and which is therefore extremely strong and robust.

It has been hitherto regarded as impossible to use sheet thermoplastics material for building boats as the material has a bad tendency to crack or craze anywhere that it is clamped or hard fastened using conventional boat building techniques. The material has therefore hitherto been discarded as unsuitable for boat building. The present invention stems from the realization that thermoplastics material (and preferably sheet acrylic material) could be used for boat building if there are no hard fastenings or fixtures, and the present method of construction by continuous bonding was developed. Numerous other unique advantages acrue from this construction method.

The end product is not only extremely tough but has a number of other unique advantages. Prime among these is the fact that the craft can be mass produced as a number of separate components (hull bottom, topside cowling, and side skirts), large quantities of the individual components stacked by nesting and transported in a compact configuration to the point of sale. In this manner a very large quantity of boat components can, for example, be packed into a standard shipping container.

At the point of sale or distribution, it is a simple assembly operation to bond together the hull bottom, topside cowling, and inflatable side skirts, to form the completed boat. To this end it is envisaged that the double-sided adhesive tape would be pre-applied to the hull bottom (and/or the topside cowling) in the appropriate areas before packaging for shipment.

It is a further feature of the boat according to the invention, that the hull bottom can be made from a transparent acrylic material providing a wide underwater viewing area through the bottom of the craft. This is not only a unique marketing advantage but has practical applications for divers, marine salvage operators, etc.

The use of inflatable side skirts provides maximum stability of the craft, maximum buoyancy, and positive flotation should the craft fill with water or capsize. The skirts can be constructed and designed specifically to carry comprehensive advertising material which makes the boat suitable as a mass advertising medium.

The configuration of the side skirts, being tapered from the back of the craft to the front of the craft uniquely achieves a narrow, strong transom to compensate for flexibility in the acrylic hull which is important as the motor-mounting on the transom must be reasonably rigid but not at the expense of the energy absorbing characteristics of the hull. The tapered tubes also give substantial buoyancy where it is most needed, i.e., in the position of the motor, fuel and occupants.

The skirts uniquely extend substantially past the transom resulting in greatly enhanced fore to aft stability. The engine, and passenger payload become more central in the craft, preventing the transom "digging in", cavitation and the craft flipping over backwards if hit by a wave.

Similarly, the craft has greatly enhanced stability in the event that it is dethrottled rapidly. The pursing bow wave cannot advance over the boat flooding it. Rather, the stern lifts due to its large bouyancy.

The boat manufactured according to the invention enjoys extraordinary low weight achieved through the non-inclusion of frames, the use of a lightweight skirt material to provide buoyancy and the lightweight of the sheet acrylic used for the hull bottom and topside cowling. This low weight gives advantages of low displacement, substantial reduction in motor size for speed, significant fuel savings, greatly reduced destructive inertia forces through wave impact or hitting solid objects, ease of handling, greater maneuverability and responsiveness, and a very low center of gravity and therefore increased stability.

The craft is also constructed of "radar invisible" materials which are highly energy absorbing. By increasing material thickness the unit can be made bullet proof. These features combined with its stackability, ultralight weight, and its ability to be four colour screen printed in "camouflage" make the craft ideally and uniquely suited to military purposes.

We claim:

1. A method of constructing a boat, comprising the steps of:

(a) forming a hull bottom from materials adapted to hold a preformed shape but to flex elastically in use, so that the preformed shape distorts to absorb impact energy, the hull bottom incorporating a bow portion and a transom with the sides of the hull bottom extending therebetween;

(b) providing side skirts in the form of inflatable tubes; and (c) securing the side skirts to the sides of the hull bottom so that the side skirts extend between the bow portion and the transom, the side skirts providing stability and structural support to the boat.

2. A method of constructing a boat as claimed in claim 1, wherein the flexible hull bottom is formed from thermoplastics material.

3. A method of constructing a boat as claimed in claim 2, wherein the thermoplastics material comprises sheet acrylic material.

4. A method of constructing a boat as claimed in claim 2, wherein the thermoplastics material comprises co-extruded acrylic and other thermoplastic material.

5. A method of constructing a boat as claimed in claim 1, wherein the step of occurring the side skirts to the hull bottom comprises fastening by way of flexible acrylic adhesive tape or glue.

6. A method of constructing a boat as claimed in claim 5, wherein the flexible adhesive tape comprises double-sided adhesive tape running the full length of all contact points.

7. A method of constructing a boat as claimed in claim 1, wherein the hull bottom is fabricated by laminating two hull shells together one inside the other, bonded by flexible energy absorbing adhesives.

8. A method of constructing a boat as claimed in claim 1, wherein the transom is reinforced by laminating a layer of sheet thermoplastics material to the transom and the hull bottom in the region of the transom, using flexible acrylic adhesive tape.

9. A method of constructing a boat as claimed in claim 1, wherein the transom is reinforced by bonding a reinforcing member to the transom.

10. The method of constructing a boat according to claim 1, further comprising the step of turning the sides of the hull bottom outward to form flanges for mounting the side skirts.

11. The method of constructing a boat according to claim 1, further comprising the step of tapering the side skirts from the transom end to a relatively smaller diameter at the bow end.

12. A boat, comprising:

a flexible hull bottom formed from a material adapted to hold a preformed shape but to flex elastically in use, so that the preformed shape of the hull distorts to absorb impact energy, the hull bottom incorporating a bow portion and a transom with the sides of the hull bottom extending therebetween; and two side skirts in the form of inflatable tubes secured to the hull bottom and extending between the bow portion and the transom, the side skirts providing stability and structural support to the boat.

13. A boat as claimed in claim 12 wherein the transom is integrally formed with the hull bottom and upturned between the side skirts at the aft end of the hull bottom.

14. A boat as claimed in claim 13, wherein the transom is reinforced by laminating a layer of sheet thermoplastics material to the transom and the hull bottom in the region of the transom, using flexible acrylic adhesive tape.

15. A boat as claimed in claim 12 wherein the side skirts are circular or oval in section and tapered in configuration from a smaller section nearer the bow to a larger section at the transom.

16. A boat as claimed in claim 15, wherein the side skirts extend aftward beyond the transom, tapering from a larger section adjacent the transom to a smaller section at their aftmost distal end.

17. A boat as claimed in claim 12, wherein the hull bottom is formed from thermoplastics material.

18. A boat as claimed in claim 17, wherein the thermoplastics material comprises sheet acrylic material.

19. The boat according to claim 12, further comprising flanges formed by turning the sides of the hull bottom outward for mounting the side skirts.

20. The boat according to claim 12, further comprising a cowling arranged above the bow portion of the hull.

* * * * *